US007723466B2

(12) United States Patent
Theelen et al.

(10) Patent No.: US 7,723,466 B2
(45) Date of Patent: May 25, 2010

(54) AROMATIC-ACRYLATE TACKIFIER RESINS

(75) Inventors: Michel Hendrikus Theelen, Westkapelle (NL); Derek William Bamborough, Nieuw en Sint Joosland (NL); Elisabeth Eduarda Catharina Geertruida Gielens, Kwadendamme (NL)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/959,851

(22) Filed: Dec. 19, 2007

(65) Prior Publication Data

US 2008/0096034 A1    Apr. 24, 2008

Related U.S. Application Data

(62) Division of application No. 10/780,987, filed on Feb. 18, 2004, now Pat. No. 7,332,540.

(51) Int. Cl.
 *C08F 6/28* (2006.01)
 *B32B 27/06* (2006.01)

(52) U.S. Cl. .............. 528/498; 528/500; 528/501; 428/500; 524/523; 524/515; 524/539; 526/318; 522/109

(58) Field of Classification Search .......... 528/498, 528/500, 501; 428/500; 524/523, 515, 539; 526/318; 522/109
See application file for complete search history.

(56) References Cited

U.S. PATENT DOCUMENTS

| 3,203,935 | A |   | 8/1965  | Miranda et al. |
|-----------|---|---|---------|----------------|
| 3,753,958 | A |   | 8/1973  | Wingler et al. |
| 3,991,136 | A |   | 11/1976 | Dalton et al. |
| 4,077,926 | A |   | 3/1978  | Sanderson et al. |
| 4,137,389 | A |   | 1/1979  | Wingler et al. |
| 4,243,500 | A |   | 1/1981  | Glennon |
| 4,303,485 | A |   | 12/1981 | Levens |
| 4,305,854 | A |   | 12/1981 | Rowe |
| 4,311,759 | A |   | 1/1982  | Glennon |
| 4,329,384 | A |   | 5/1982  | Vesley et al. |
| 4,330,590 | A |   | 5/1982  | Vesley |
| 4,361,680 | A |   | 11/1982 | Borg et al. |
| 4,391,687 | A |   | 7/1983  | Vesley |
| 4,404,338 | A |   | 9/1983  | De Toffol et al. |
| 4,483,951 | A |   | 11/1984 | Brenner |
| 4,529,787 | A |   | 7/1985  | Schmidt et al. |
| 4,533,566 | A |   | 8/1985  | Evans et al. |
| 4,537,734 | A |   | 8/1985  | Morganstern |
| 4,540,739 | A |   | 9/1985  | Midgley |
| 4,587,289 | A |   | 5/1986  | Comert et al. |
| 4,695,621 | A |   | 9/1987  | Allada |
| 4,737,577 | A | * | 4/1988  | Brown ............ 528/501 |
| 4,912,169 | A | * | 3/1990  | Whitmire et al. ...... 525/221 |
| 4,929,717 | A |   | 5/1990  | Chmelir |
| 4,948,825 | A |   | 8/1990  | Sasaki |
| 4,952,435 | A |   | 8/1990  | Okita |
| 4,968,373 | A |   | 11/1990 | Chevalier et al. |
| 4,968,559 | A |   | 11/1990 | Kuroda et al. |
| 4,968,740 | A |   | 11/1990 | Makati et al. |
| 5,028,484 | A |   | 7/1991  | Martin et al. |
| 5,100,963 | A |   | 3/1992  | Lin |
| 5,104,921 | A |   | 4/1992  | Erickson et al. |
| 5,112,882 | A |   | 5/1992  | Babu et al. |
| 5,115,008 | A |   | 5/1992  | Sasaki |
| 5,227,213 | A |   | 7/1993  | Komori et al. |
| 5,236,991 | A |   | 8/1993  | Makati et al. |
| 5,242,980 | A |   | 9/1993  | Tse |
| 5,244,962 | A |   | 9/1993  | Plamthottam et al. |
| 5,338,810 | A |   | 8/1994  | Shimomura et al. |
| 5,373,066 | A |   | 12/1994 | Rebre et al. |
| 5,534,575 | A |   | 7/1996  | Foster et al. |
| 5,623,011 | A |   | 4/1997  | Bernard |
| 5,695,837 | A |   | 12/1997 | Everaerts et al. |
| 5,747,551 | A |   | 5/1998  | Lewandowski et al. |

(Continued)

FOREIGN PATENT DOCUMENTS

CA    1 068 047 A    12/1979

(Continued)

OTHER PUBLICATIONS

Notification of Transmittal of the International Search Report and the Written Opinion of the International Searching Authority, or the Declaration date of mailing Jun. 30, 2005.
Patent Search related to Styrene-Acrylic Polymers for Use as Adhesives performed by Jaeckle Fleischmann & Mugel, LLP dated Apr. 26, 2005.
Notice of Allowance dated Oct. 19, 2007 in related U.S. Appl. No. 10/780,987; now US Patent No. 7,332,540.
Supplemental Notice of Allowance dated Dec. 31, 2007 in related U.S. Appl. No. 10/780,987; now US Patent No. 7,332,540.

*Primary Examiner*—Robert D. Harlan
(74) *Attorney, Agent, or Firm*—Polly C. Owen; Bernard J. Graves, Jr.

(57) ABSTRACT

A tackifier resin is provided comprising monomer units from at least one aromatic monomer and at least one acrylate monomer; wherein the tackifier resin has a low residual monomer concentration. In other embodiments of the invention, the tackifier resin does not significantly decrease the moisture vapor transport rate of an adhesive composition comprising the tackifier resin, does not significantly increase fogging of an adhesive composition comprising the tackifier resin, and does not significantly exhibit skin sensitivity properties. A process to produce the tackifier resin is also provided. The process comprises contacting a tackifier resin product stream with at least one carrier at a temperature sufficient to remove a portion of at least one residual monomer from the tackifier resin product stream to produce the tackifier resin.

9 Claims, 1 Drawing Sheet

U.S. PATENT DOCUMENTS

| | | |
|---|---|---|
| 5,789,511 A | 8/1998 | Kimpton et al. |
| 5,837,749 A | 11/1998 | Erickson et al. |
| 5,852,124 A | 12/1998 | Wang et al. |
| 5,969,025 A | 10/1999 | Corzani |
| 6,140,400 A | 10/2000 | Figge et al. |
| 6,160,059 A | 12/2000 | Roth et al. |
| 6,210,517 B1 | 4/2001 | Eadara et al. |
| 6,214,925 B1 | 4/2001 | Schuler et al. |
| 6,339,112 B1 | 1/2002 | Kauffman et al. |
| 6,410,683 B1 | 6/2002 | Craig |
| 6,502,621 B2 | 1/2003 | Sonnenberg et al. |
| 6,552,141 B1 | 4/2003 | Chmelir et al. |
| 6,783,850 B2 | 8/2004 | Takizawa et al. |
| 7,238,732 B2 | 7/2007 | Bamborough et al. |
| 7,262,242 B2 | 8/2007 | Gielens et al. |
| 2003/0008140 A1 | 1/2003 | Takizawa et al. |
| 2003/0027961 A1 | 2/2003 | Chmelier et al. |
| 2003/0181540 A1 | 9/2003 | Quellet et al. |

FOREIGN PATENT DOCUMENTS

| | | |
|---|---|---|
| DE | 100 63 018 A1 | 7/2002 |
| EP | 0 050 261 A1 | 4/1982 |
| EP | 0 158 524 A2 | 10/1985 |
| EP | 0 197 460 A2 | 10/1986 |
| EP | 0 197 845 B1 | 1/1989 |
| EP | 0 303 430 A1 | 2/1989 |
| EP | 0 342 808 A1 | 11/1989 |
| EP | 0 354 521 A2 | 2/1990 |
| EP | 0 357 204 A2 | 3/1990 |
| EP | 0 416 921 A1 | 3/1991 |
| EP | 0 474 412 A2 | 3/1992 |
| EP | 0 476 168 A1 | 3/1992 |
| EP | 0 604 709 A2 | 7/1994 |
| EP | 0 620 257 A2 | 10/1994 |
| EP | 0 699 800 A2 | 3/1996 |
| EP | 0 710 708 A2 | 5/1996 |
| EP | 0 963 760 A1 | 12/1999 |
| EP | 1 130 070 | 9/2001 |
| EP | 1 180 533 A1 | 2/2002 |
| EP | 1 193 289 A1 | 4/2002 |
| EP | 1 256 614 A2 | 11/2002 |
| EP | 1 258 515 A2 | 11/2002 |
| GB | 1 448 937 | 9/1976 |
| JP | 54003136 | 1/1979 |
| JP | 56149481 A | 11/1981 |
| JP | 60144303 | 7/1985 |
| JP | 8-27450 A | 1/1996 |
| JP | 8-333425 A | 12/1996 |
| JP | 09-059462 | 3/1997 |
| JP | 2003-040935 | 2/2003 |
| WO | WO 93/11184 A1 | 6/1993 |
| WO | WO 93/24547 A1 | 12/1993 |
| WO | WO 94/13750 A1 | 6/1994 |
| WO | WO 95/13331 A1 | 5/1995 |
| WO | WO 96/33246 A1 | 10/1996 |
| WO | WO 96/35725 A1 | 11/1996 |
| WO | WO 97/26307 A1 | 7/1997 |
| WO | WO 97/29140 A1 | 8/1997 |
| WO | WO 97/31076 A1 | 8/1997 |
| WO | WO 98/23699 A1 | 6/1998 |
| WO | WO 99/62685 A1 | 12/1999 |
| WO | WO 00/22062 A1 | 4/2000 |
| WO | WO 00/27942 A1 | 5/2000 |
| WO | WO 00/39189 A1 | 7/2000 |
| WO | WO 01/16244 A1 | 3/2001 |
| WO | WO 01/55276 A1 | 8/2001 |
| WO | WO 01/81495 A2 | 11/2001 |
| WO | WO 02/053602 A1 | 7/2002 |
| WO | WO 03/011959 A1 | 2/2003 |

* cited by examiner

AROMATIC-ACRYLATE TACKIFIER RESINS

This application is a divisional of U.S. application Ser. No. 10/780,987 filed on Feb. 18, 2004, now U.S. Pat. No. 7,332,540, which is hereby incorporated by reference in its entirety to the extent that it does not contradict statements herein.

FIELD OF THE INVENTION

This invention is related to the field of tackifier resins. More specifically, this invention is related to the field of tackifier resins having repeating units from at least one aromatic monomer and at least one acrylate monomer. The invention is also related to the field of processes to produce these tackifier resins.

BACKGROUND OF THE INVENTION

Tackifying resins are used to modify various types of adhesive compositions. Traditional tackifier resins include, for example, rosins, rosin esters, colophonium-based resins, $C_5$ and $C_9$ based hydrocarbon resins, terpene based resins, coumarone and indene-based resins, and phenolic resins. These tackifiers are used to produce, for example, pressure-sensitive adhesives and hot-melt adhesives.

Many of these commercial tackifier resins cannot be used in certain applications. For example, in medical applications, some tackifiers cannot be utilized due to skin sensitivity concerns. The medical adhesive industry has a perception that rosins and rosin esters can cause skin sensitivity, therefore, rosins and rosins esters may not be used in this application.

In addition, tackifier resins used in many adhesive applications need to be clear and to not cause fogging. Also, tackifier resins may also need to not inhibit the breathability of an adhesive composition as indicated by the moisture vapor transport rate of the adhesive composition after the tackifier resin is added.

Therefore, there is a need in the adhesive industry for new tackifier resins that can provide these properties to adhesive compositions.

BRIEF SUMMARY OF THE INVENTION

Applicants have developed a tackifier resin that can provide needed properties for an adhesive manufacturer including at least one of the following: low residual monomer concentration, low residual solvent concentration, low skin sensitivity, clarity, low fogging, and improved moisture vapor transport rate of the adhesive composition.

In accordance with one embodiment of this invention, a tackifier resin is provided comprising monomer units from at least one aromatic monomer and at least one acrylate monomer; wherein the tackifier resin has a styrene-acrylate tackifier resin.

In accordance with another embodiment of this invention, a tackifier resin is provided comprising repeating units of at least one aromatic monomer and at least one acrylate monomer; wherein the tackifier resin does not significantly decrease the moisture vapor transport rate of an adhesive composition comprising the tackifier resin.

In accordance with another embodiment of this invention, a tackifier resin is provided comprising repeating units of at least one aromatic monomer and at least one acrylate monomer; wherein the tackifier resin does not significantly increase fogging of an adhesive composition comprising the tackifier resin.

In accordance with another embodiment of this invention, a tackifier resin is provided comprising repeating units of at least one aromatic monomer and at least one acrylate monomer; wherein the tackifier resin does not significantly exhibit skin sensitivity properties.

In accordance with another embodiment of this invention, a process to produce the tackifier resin is provided. The process comprises: contacting a tackifier resin product stream with at least one carrier at a temperature sufficient to remove a portion of at least one residual monomer from the tackifier resin product stream to produce the tackifier resin.

In accordance with another embodiment of this invention, a process to produce a tackifier resin is provided. The process comprises:

a) providing at least one aromatic monomer, at least one acrylate monomer, and optionally, at least one solvent to a reactor zone to produce a reaction mixture;

b) polymerizing the reaction mixture in the presence of at least one initiator to produce a tackifier resin product stream; and c) contacting the tackifier resin product stream with a carrier to remove a portion of at least one residual monomer from the tackifier resin product stream to yield the tackifier resin.

In accordance with yet another embodiment of this invention, a process to produce a tackifier resin is provided. The process comprises:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream;

c) heating the tackifier resin product stream at a temperature sufficient to remove a portion of at least one residual monomer from the tackifier resin product stream; and d) contacting the tackifier resin product stream with at least one carrier to further remove a portion the residual monomers to produce the tackifier resin.

In accordance with still another embodiment of this invention, an adhesive composition comprising the tackifier resin is also provided.

DETAILED DESCRIPTION

Figure 1:
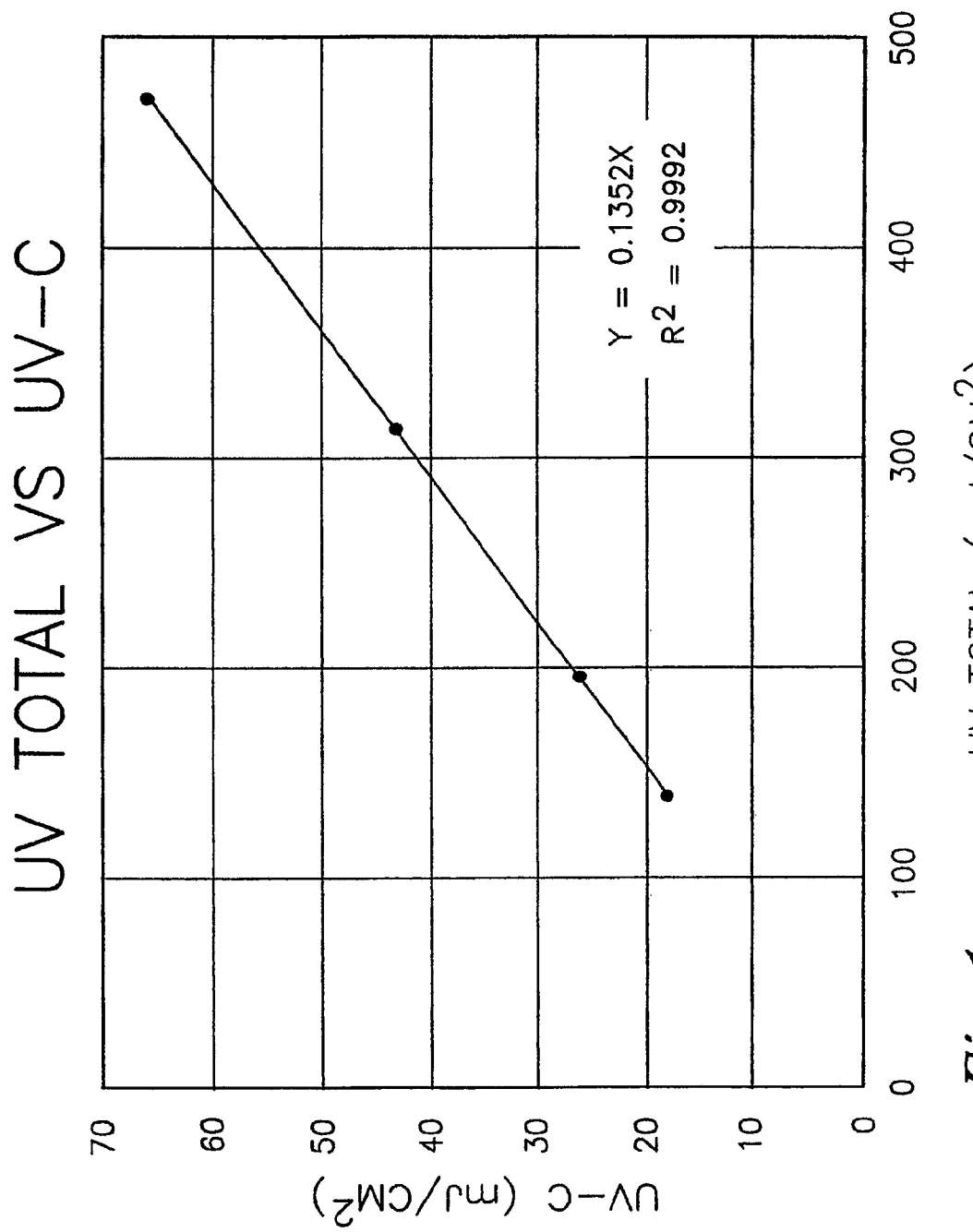
FIG. 1 shows the relationship between Total UV and UV-C dose.

In one embodiment of this invention, a tackifier resin is provided comprising repeating units of at least one aromatic monomer and at least one acrylate monomer; wherein the tackifier resin has a styrene-acrylate tackifier resin.

The aromatic monomer can be any aromatic monomer known in the art capable of polymerizing with at least one acrylate monomer. The term "aromatic monomer" means a monomer containing at least one group of unsaturated cyclic hydrocarbons containing one or more rings. Examples of aromatic monomers include, but are not limited to, olefinic substituted aromatics, such as, styrene, alpha-methyl styrene, vinyl toluene, indene, methylindenes, divinylbenzene, dicyclopentadiene, and methyl-dicyclopentadiene. Most preferably, the aromatic monomer is styrene. The aromatic monomer can be added to a reactor zone in the polymerization process as a single type of monomer or a mixture and can be added in varying amounts and at varying addition times during the polymerization.

The acrylate monomer is any acrylate monomer known in the art capable of polymerizing with the aromatic monomer. The acrylate monomer can be added to a reactor zone in the polymerization process as a single type of monomer or as a mixture and can be added in varying amounts and at varying addition times during the polymerization.

In one embodiment, the acrylate monomer has the general formula:

$$R_1—CH=CR_2—COOR_3$$

wherein $R_1$ is selected from the group consisting of hydrogen, aliphatic groups, and aromatic groups; wherein $R_2$ is selected from the group consisting of hydrogen, aliphatic groups, and aromatic groups; and wherein $R_3$ is selected from the group consisting of hydrogen, aliphatic groups, aromatic groups. The term "aliphatic" is defined as a straight or branched chain arrangement of constituent carbon atoms and includes, but is not limited to, alkanes, alkenes, alkadienes, and alkynes. The aliphatic groups can contain functional groups, such as, but not limited to, hydroxyl, cycloaliphatic, acid, epoxide, amide, acrylonitrile and acrylate. Preferably, the aliphatic group has 1 to about 20 carbon atoms, more preferably, from 1 to 12. The term "aromatic group" means at least one group of unsaturated cyclic hydrocarbons containing one or more rings. Aromatic groups can be selected from the group consisting of both unsubstituted and substituted aromatic groups having constituents with up to about 6 carbon atoms. Preferably, the aromatic group has about 6 to about 20 carbon atoms. The aromatic groups can contain functional groups, such as, but not limited to, hydroxyl, cycloaliphatic, acid, epoxide, amide, acrylonitrile and acrylate. In some cases, these functional groups can lead to an acrylate monomer that has more than one reactive site for polymerization or other reactions.

In one embodiment, both $R_1$ and $R_2$ of the acrylate monomer are hydrogen. When the acrylate monomer is a methacrylic compound, $R_2$ is a $CH_3$ group.

For acid functionality monomers, $R_3$ is often hydrogen, such as, acrylic acid and methacrylic acid. The acid functionality monomers can also be difunctional components such as, for example, maleic acid, fumaric acid or can be the anhydride forms of these components.

In another embodiment, the functional group is often found in the $R_3$ group. Suitable examples are hydroxyethylacrylate, glycidylmethacrylate, and 1,3-butanediol dimethylacrylate.

Examples of acrylate monomers include, but are not limited to, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl(meth)acrylate, lauryl methacrylate, lauryl acrylate, tridecyl acrylate, tridecyl methacrylate, stearyl acrylate, stearyl methacrylate, glycidyl methacrylate, alkyl crotonates, vinyl acetate, di-n-butyl maleate, di-octylmaleate, acetoacetoxyethyl methacrylate, acetoacetoxyethyl acrylate, acetoacetoxypropyl methacrylate, acetoacetoxypropyl acrylate, diacetone acrylamide, acrylamide, methacrylamide, hydroxyethyl methacrylate, hydroxyethyl acrylate, allyl methacrylate, tetrahydrofurfuryl methacrylate, tetrahydrofurfuryl acrylate, cyclohexyl methacrylate, cyclohexyl acrylate, n-hexyl acrylate, n-hexyl methacrylate, 2-ethoxyethyl acrylate, 2-ethoxyethyl methacrylate, isodecyl methacrylate, isodecyl acrylate, 2-methoxy acrylate, 2-methoxy methacrylate, 2-(2-ethoxyethoxy)ethylacrylate, 2-phenoxyethyl acrylate, 2-phenoxyethyl methacrylate, isobornyl acrylate, isobornyl methacrylate, caprolactone acrylate, caprolactone methacrylate, polypropyleneglycol monoacrylate, polypropyleneglycol monomethacrylate, poyethyleneglycol(400) acrylate, polypropyleneglycol(400) methacrylate, benzyl acrylate, benzyl methacrylate, sodium 1-allyloxy-2-hydroylpropyl sulfonate, acrylonitrile, and the like.

Acrylate monomers are described in "The Brandon Worldwide Monomer Reference Guide and Sourcebook" Second Edition, 1992, Brandon Associates, Merrimack, N.H.; and in "Polymers and Monomers", the 1996-1997 Catalog from Polyscience, Inc., Warrington, Pa.

Two or more of the acrylate monomers may be used in combination. Preferably, the acrylate monomer has up to about 20 carbon atoms, such as, but not limited to, acrylic acid, 2-ethylhexyl acrylate, methyl methacrylate, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, 2-methylheptyl(meth)acrylate, octyl acrylate, octyl methacrylate, isooctyl(meth)acrylate, n-nonyl(meth)acrylate, iso-nonyl(meth)acrylate, decyl(meth)acrylate, isodecyl acrylate, isodecyl methacrylate, dodecyl(meth)acrylate, isobornyl (meth)acrylate, hydroxyethyl methacrylate, hydroxyethyl acrylate, allyl methacrylate, cyclohexyl methacrylate, cyclohexyl acrylate, n-hexyl acrylate, n-hexyl methacrylate, isobornyl acrylate, isobornyl methacrylate, and the like. Most preferably, the acrylate monomers are acrylic acid and 2-ethylhexyl acrylate.

Functionality can be built in to the tackifier resin by choosing an acrylate monomer containing at least one functional group. The functional group can be selected from hydroxy, cycloaliphatic, acid, epoxide, amide, acrylonitrile and acrylate groups. Most preferable, the acrylate monomer contains acid groups or hydroxyl groups. This functionality can lead to even better cohesion in the adhesive composition as determined by the Shear Adhesion Failure Test (SAFT), however, the tackifier resin can be less heat stable due to trans-esterification reactions. Other specific functional groups can be chosen to improve MVTR, fogging, and adhesion.

The tackifier resin can be produced by any process known in the art. In one embodiment, the tackifier resin can be produced by a radical catalyzed polymerization mechanism:

Decomposition: I - - - 2*R.
Initiation: R.+M - - - $M_1$.
Propagation: $M_i$.+M - - - $M_{i+1}$.
Termination: $M_i$.+$M_j$. - - - $M_i$+$M_j$ wherein I represents an initiator; R. represents a radical; and M represents a monomer.

Any polymerization initiator known in the art for radical catalyzed polymerization can be utilized. Initiators are typically chosen based on the desired molecular weight of the tackifier resin and the polymerization temperature. The effect of decomposition products of the initiator on the odor of the tackifier resin can also be a factor. Suitable initiators can be chosen from all kinds of commercially available organic peroxides, such as, but not limited to, diacyl peroxides, dialkylperoxidicarbonates, tert-alkyl peroxyesters, di-tert-alkyl peroxides, tert-alkyl hydroperoxides, ketone peroxides, and mixtures thereof. Preferably, the initiator is selected from the group consisting of di-tert-butyl peroxide, dicumyl peroxide, and di-amyl peroxide.

The radical catalyzed polymerization can occur in a reactor zone in the presence of at least one solvent. Processes may also be used without the use of solvents. Generally, the reactor zone comprises at least one reactor. The solvent can be any solvent that is known in the art to be utilized in radical catalyzed polymerizations. Examples of solvents include, but are not limited to, xylene, toluene, ethylbenzene, trimethylbenzene, and mixtures thereof. Preferably, the solvent is xylene or a mixture of the isomers of methyethylbenzene, trimethylbenzene, ethyl-dimethylbenzene, propylmethylbenzene and tetramethylbenzene. Most preferably, the solvent is xylene.

Radical catalyzed polymerization to produce the tackifier resins can be batch, fed batch or continuous. Reaction temperatures for the radical catalyzed polymerization can be from 0 to about 250° C., preferably from about 100° C. to about 200° C., and most preferably from 150° C. to 160° C. Initiator levels can be from about 0.1% by weight to about 6% by weight based on the weight of the monomer feed, preferably the amount of initiator can range from 0.1% to 3%.

In one embodiment, a process to produce a tackifier resin is provided comprising contacting a tackifier resin product stream with at least one carrier at a temperature sufficient to remove a portion of at least one residual monomer to produce the tackifier resin. Residual monomer is defined as unreacted monomer or monomers contained in the tackifier resin. The tackifier resin product stream comprises tackifier resin and optionally, solvent. A portion of the residual solvent can also be removed from the tackifier resin product stream. The tackifier resin and solvent were previously discussed in this disclosure.

The tackifier resin concentration is particularly useful in adhesives for medical applications since it can have a clear color. The low residual monomer concentration in the inventive tackifier resin can also reduce or eliminate skin sensitivity properties. It can also give much better fogging behavior of the adhesive composition over adhesive compositions containing tackifier resins without low residual monomer concentrations.

The amount of the residual monomer in the tackifier resin depends on the use of the adhesive composition. In one embodiment, the inventive tackifier resin can have a low residual monomer concentration such that the tackifier resin does not significantly decrease the MVTR of the adhesive composition. A tackifier resin does not significantly decrease the MVTR of the adhesive composition if the MVTR is not decreased by more than 25%, preferably 10% over the adhesive composition without the tackifier resin. Preferably, the MVTR of the adhesive composition is the same or increased over the adhesive composition without the tackifier resin. For example, the MVTR of the adhesive composition can range from about 200 to about 3000, preferably from 500 to 1500.

The contacting of the tackifier resin product stream with the carrier to remove a portion of the residual monomers can be conducted by any means known in the art. Examples of carriers include, but are not limited to, steam, nitrogen and ethane. Preferably, the carrier is stream. The temperature and pressure of the carrier is that which is sufficient to remove a portion of the residual monomers to obtain the desired residual monomer concentration of the tackifier resin or desired MVTR of the adhesive composition. Depending on the application, it may also be desirous that the residual monomer concentration of the tackifier resin is such that it does not increase fogging of the adhesive composition or cause any significant level of skin sensitivity. Preferably, the residual monomer concentration of the tackifier resin is less than about 600 ppm by weight based on the weight of the tackifier resin, more preferably less than about 300 ppm by weight, and most preferably, less than 250 ppm by weight.

In another embodiment, the residual monomer level of the tackifier resin is less than about 200 ppm aromatic monomer based on the weight of the tackifier resin and less than about 400 ppm acrylic monomer, preferably less than about 100 ppm by weight aromatic monomer and less than about 200 ppm by weight acrylic monomer, and most preferably, less than 100 ppm by weight aromatic monomer and less than 150 ppm by weight acrylic monomer.

In yet another embodiment of this invention, the residual solvent level in the tackifier resin is less than about 500 ppm by weight based on the weight of the tackifier resin, preferably less than about 200 ppm by weight, and most preferably, less than 50 ppm by weight.

The contacting of the tackifier resin product stream with the carrier can occur at any temperature and pressure sufficient to obtain the desired residual monomer concentration in the tackifier resin. Preferably, the contacting can occur at a temperature in the range of about 150° C. to about 250° C., more preferably, from 160° C. to 220° C. Preferably, the contacting of the tackifier resin product stream with the carrier occurs at a pressure in the range of about 10 mbar to about 1000 mbar, preferably from 20 mbar to 200 mbar.

In another embodiment of this invention, a process to produce the tackifier resin is provided. The process comprises:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream; and c) contacting the tackifier resin product stream with a carrier to remove a portion of at least one residual monomer from the tackifier resin product stream to yield the tackifier resin. The process of contacting the tackifier resin product stream with the carrier has been previously discussed in this disclosure.

In another embodiment of this invention, a process to produce the tackifier resin is provided. The process comprises:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream;

c) heating the tackifier resin product stream at a temperature sufficient to remove a portion of at least one residual monomer from the tackifier resin product stream; and d) contacting the tackifier resin product stream with at least one carrier to further remove a portion of the residual monomers to produce the tackifier resin. Preferably, the residual monomer concentration of the tackifier resin is less than about 600 ppm by weight based on the weight of the tackifier resin. The residual monomer concentration and residual solvent concentration can vary and were discussed previously in this disclosure.

The heating of the tackifier resin product stream can be conducted by any method known in the art. For example, the tackifier resin product stream can be heated while in the reactor vessel or it can be removed to other processing equipment. The heating is conducted at a temperature and pressure sufficient to remove a portion of at least one residual monomer. The temperature however should not be too high to cause color deterioration of the tackifier resin. The residual monomer can be removed by heating the tackifier resin product stream to a temperature ranging from about 150° C. to about 250° C., preferably 160° C. to 220° C. The pressure can vary from about 10 mbar to about 1000 mbar, preferably from 20 mbar to 200 mbar. Generally, the portion removed can range from about 1% by weight to about 200% by weight based on the weight of the tackifier resin. Preferably, the portion removed can range from 50% by weight to 150% by weight. The duration of the heating varies depending on the amount of tackifier resin product stream to be handled. For example, the duration can range from about 0.5 hours to about 8 hours.

The contacting of the tackifier resin product stream with a carrier was previously described in this disclosure.

In another embodiment, a tackifier resin is produced by a process comprising:

a) providing at least one aromatic monomer, at least one acrylate monomer, and optionally at least one solvent to a reactor zone to produce a reaction mixture;

b) polymerizing the reaction mixture in the presence of at least one initiator to produce a tackifier resin product stream;

c) heating the tackifier resin product stream at a temperature in a range of about 150° C. to about 250° C. to remove a portion of the residual monomers from the tackifier resin product stream; and d) contacting the tackifier resin product stream with a carrier to further remove a portion of the residual monomers to yield the tackifier resin having residual monomer concentrations of less than about 200 ppm of aromatic monomer and 400 ppm of acrylate monomer. The residual monomer level and residual solvent level can vary as discussed previously in this disclosure.

In yet another embodiment of the invention, the tackifier resin is produced by a process comprising:

a) contacting at least one aromatic monomer, at least one acrylate monomer, and at least one initiator to produce a monomer-initiator stream;

b) routing the monomer-initiator stream to a reaction zone containing solvent at a temperature in the range of about 100° C. to about 250° C.;

c) polymerizing the monomer-initiator feed stream at polymerization conditions to produce a tackifier resin product stream;

d) optionally, providing an additional amount of initiator to the reaction zone;

e) heating the tackifier resin product stream at a temperature in a range of about 150° C. to about 250° C. and at a pressure of about 10 mbar to about 1000 mbar to remove a portion of the residual monomer from the tackifier resin product stream; and f) contacting the tackifier resin product stream with steam at a temperature of about 150° C. to about 250° C. and at a pressure of about 10 mbar to about 1000 mbar to further remove residual monomers from the tackifier resin product stream to yield the tackifier resin having residual monomer concentrations of less than 200 ppm by weight of aromatic monomer based on the weight of the tackifier resin and 400 ppm of acrylate monomer based on the weight of the tackifier resin. The tackifier resin can also have a residual solvent concentration of less than about 500 ppm.

By careful choice of the type of aromatic monomer and acrylic monomer, it is possible to control and fine-tune the properties of the adhesive composition for specific applications. Possible variations in the tackifier resin polymerization process are aromatic monomer type, acrylate monomer type, functionality in the form of acid or hydroxyl groups in the acrylate monomer, different process conditions, which all result in different softening points and molecular weights of the tackifier resin.

The amount of aromatic monomer repeating units in the tackifier resin can range from about 0.1% to 99.9% based on the total amount of monomer repeating units in the tackifier resin, preferably from about 20% to about 70%, and most preferably from 25% to 65%. The amount of acrylate monomer repeating units in the tackifier resin can range from 0.1% to 99.9%, preferably from about 30% to about 80%, and most preferably, from 35% to 75% based on the total amount of monomer repeating units in the tackifier resin.

The tackifier resin can have a R&B softening point ranging from being a liquid at room temperature to about 180° C. preferably from about 50° C. to about 150° C., and most preferably, from 75° C. to 120° C. The acid number of the tackifier resin can range from about 0 to about 300 mg KOH/g resin, preferably from about 0 mg KOH/g resin to about 200 mg KOH/g resin, and most preferably from 5 to 150 mg KOH/g resin. The hydroxyl number can vary from about 0 to about 300, preferably from 0 to 200. The MMAP cloud point of the tackifier resin is typically less than 50° C., preferably the MMAP ranges from about −20° C. to about 30° C., and most preferably from −10° C. to 20° C.

The number average molecular weight (Mn) of the tackifier resin can range from about 1,500 to about 7,000 daltons, preferably from about 1,600 to about 4,500, and most preferably from 2,000 to 4,000. The weight average molecular weight (Mw) of the tackifier resin can range from about 2,000 to about 25,000 daltons, preferably from about 2,500 to about 12,000 and most preferably from 3,000 to 10,000. The z-average molecular weight (Mz) of the tackifier resin can range from about 3,000 to about 75,000 daltons, preferably from about 4,500 to about 30,000, and most preferably 5,000 to 20,000.

In one embodiment of this invention, the Gardner color of the tackifier resin generally is lower than 5, preferably is lower than 2, and most preferably is lower than 1. When the tackifier resin is used in medical applications, the Gardner color of the tackifier resin is generally lower than 2, and preferably is lower than 1. Light colored tackifier resins are often required for certain applications, especially in the medical adhesive field.

When the adhesive composition is used in medical applications, the residual monomer concentrations in the tackifier resin is typically less than about 200 ppm by weight aromatic monomer based on the weight of the tackifier resin and less than about 400 ppm by weight acrylic monomer based on the weight of the tackifier resin. Preferably, the amount of residual aromatic monomer is less than about 100 ppm by weight, and the amount of residual acrylic monomer is less than about 200 ppm by weight based on the weight of the tackifier resin. Most preferably, the amount of residual aromatic monomer is less than 100 ppm by weight based on the weight of the tackifier resin, and the amount of residual acrylic monomer is less than 150 ppm based on the weight of the tackifier resin.

Also, especially for use in medical applications, the residual solvent in the tackifier resin is less than about 500 ppm based on the weight of the tackifier resin, preferably less than about 200 ppm, and most preferably, less than 50 ppm.

In another embodiment of this invention, the tackifier resin comprises monomer repeating units from at least one aromatic monomer and monomer repeating units from at least one acrylate monomer, wherein the monomer repeating units is at least one selected from styrene, acrylic acid, and 2-ethylhexyl acrylate. The amount of styrene repeating units can range from 0.1 to 99.9% based on the total amount of monomer repeating units in the tackifier resin. The amount of acrylic acid and 2-ethylhexyl acrylate can range from 0.1% to 99.9% based on the total amount of monomer repeating units in the tackifier resin. Preferably, the amount of styrene repeating units can range from about 20% to about 70%, and the combined amount of acrylic acid repeating units and 2-ethylhexyl acrylate repeating units can range from about 30% to about 80%. Most preferably, the amount of styrene repeating units can range from 25% to 65%, and the combined amount of acrylic acid repeating units and 2-ethylhexyl acrylate repeating units can range from 35% to 75%.

When polymerization occurs at a temperature lower than about 160° C., the amount of acrylic acid in the tackifier resin can be less than about 30% in order to help prevent gelling of the tackifier resin. However, at polymerization temperatures in the range of about 160° C. to about 250° C., the amount of acrylic acid in the tackifier resin can range from 0.1% to 99.9%.

In another embodiment of this invention, a process is provided to produce the adhesive composition. The process comprises contacting at least one tackifier resin and at least one adhesive component to produce the adhesive composition.

The composition of the adhesive composition may be adjusted by adding a surfactant or by diluting with water or an aqueous medium. In addition, various additives can be added to the adhesive composition to give the adhesive composition desired properties or for preventing degradation, or for any other purpose. Such additives include, but are not limited to, reinforcing agents, fire retardants, foaming agents, conventional tackifiers, plasticizers, oils, antioxidants, polymers, curable/reactive monomers, crosslinking agents, fillers, and pigments. Because of the number of possible compounding ingredients, the properties of the tackifier resin prepared according to this invention can be varied to satisfy most foreseeable requirements for tack, peel, strength, shear strength, and solvent media resistant, on whatever combination of substrate utilized.

Any adhesive component known in the art can be utilized. Adhesive components include, but are not limited to, polyurethanes; poly ether amides block copolymers; polyethylene copolymers, including, but not limited to, polyethylene-vinyl acetate, polyethylene-butyl acrylate, polyethylene-2-ethyl hexyl acrylate, polyethylene-methyl acrylate, polyethylene-acrylic acid, polyethylene oxide and its copolymers; amorphous poly-alpha olefins and the functionalized copolymers thereof; poly lactide and copolymers; polyamides; polyesters and co-polyesters; polyester block copolymers; functionalized polyesters and co-polyesters including, but not limited to, sulphonated polyesters; polyacrylic compositions; polyvinyl ethers; poly caprolactones and copolymers; epoxides and copolymers thereof including, but not limited to, urethane-epoxides; isoprene compositions; poly-isobutylene and functionalized types; poly-butadiene and functionalized types; poly-butyl, polybutene and functionalized types; styrene block copolymers including, but not limited to, functionalized types such as maleic modified styrene ethylene butadiene styrene (m-SEBS), and mixtures thereof.

The adhesive composition can be coated on a substrate by any method known in the art. For example, the coating can be accomplished by knife coating, roll coating, gravure coating, and curtain coating. Coating thickness varies depending on the application. Suitable coating thicknesses can range from about 0 g/m$^2$ to about 200 g/m$^2$, preferably, from 10 g/m$^2$ to 100 g/m$^2$.

The adhesive composition can be coated on a wide array of substrates. Suitable examples include, but are not limited to, polymer films such as polyethylene terephthalate (PET) and biaxially oriented polypropylene (BOPP); woven and non-woven fabrics; metals and metal foils, such as aluminum copper lead, gold and the like; paper; glass; ceramics; and composite materials comprising laminates of one or more of these materials.

In one embodiment, the adhesive composition is used as a pressure-sensitive adhesive. Generally, pressure-sensitive adhesives comprise at least one elastomeric polymer and at least one tackifier resin. The pressure-sensitive adhesive can further comprise at least one additive. Examples of additives for adhesive compositions were previously given in this disclosure. Elastomeric polymers include, but are not limited to, natural rubber, butyl rubber, acrylic polymers, and block copolymers, such as styrene-butadiene-styrene block copolymers and styrene-isoprene-styrene block copolymers.

In another embodiment, the tackifier resin is utilized to produce hot-melt adhesives. Hot-melt adhesives are nonvolatile thermoplastic materials that can be heated to a melt and then applied as a liquid to a substrate. Thermoplastic materials include, but are not limited to, ethylene-vinyl acetate polymers, paraffin waxes, polypropylene, phenoxy resins, styrene-butadiene copolymers, ethylene-ethyl acrylate copolymers, polyesters, polyamides, polyurethanes, and mixtures thereof. Hot-melt adhesives can further comprise at least one additive. Examples of additives for adhesive compositions were previously given in this disclosure.

Possible adhesive applications in which the adhesive composition may be used are numerous. Examples include, but are not limited to, skin-contact medical applications, surgical tapes, bandages, wound care, operation tapes and drapes, hygiene applications including feminine care products, box sealing tapes, masking applications, low fogging, automotive interior applications including foam gaskets, instrument displays, sound deadening, trim bonding, sealants, chaulks, general pressure sensitive adhesives, semi-pressure sensitive adhesives, building and hydroxyl ion adhesives, assembly adhesives, adhesive films and membranes, bottle labeling, water soluble adhesives, laminating adhesives, adhesives for flexible packaging, concrete curing compounds, mounting tapes, double sided tapes, electrical tapes, permanent and removable labels, filmic labels, pressure sensitive adhesives for the graphic industry, labels for laser printers, insulation tapes, primer compounds, tie layers, road marking adhesives, inks, mounting tapes, labels for chemicals including sea water resistant labels, and labeling for pharmaceuticals and cosmetics, etc.

Another embodiment of this invention comprises a laminated structure of at least a first and a second substrate, the substrates being joined by a layer of the adhesive composition.

The invention has been described in detail with particular reference to preferred embodiments thereof, but it will be understood that variations and modifications can be effected within the spirit and scope of the invention.

EXAMPLES

This invention can be further illustrated by the following examples of preferred embodiments thereof, although it will be understood that these examples are included merely for purposes of illustration and are not intended to limit the scope of the invention unless otherwise specifically indicated.

Test Methods

Acid number was determined by ASTM D974-02.

Compatibility of the tackifier resin was determined by mixing the tackifier resin with an adhesive component in the desired ratio at about 150° C. to produce a tackifier resin/adhesive component mixture. The tackifier resin/adhesive component mixture was then poured on a heat bank. The heat bank consisted of a metal plate with a temperature gradient from 50° C. to 200° C. On the left side, the heat bank was cool, on the right side, the heat bank was warm, and in between these two points, a temperature gradient was calibrated. A clear tackifier resin/adhesive component mixture indicated a compatible system. Hazy tackifier resin/adhesive component mixtures were incompatible. When the tackifier resin/adhesive component mixture stayed clear over the entire heat bank, the cloud point or compatibility temperature was <50° C. When the tackifier resin/adhesive component mixture was cloudy over the entire bank, the cloud point was >200° C. When the tackifier resin/adhesive component mixture was clear above a certain temperature and cloudy below a certain temperature, the temperature at which it was cloudy was the cloud point. Table 1 below summarizes the results of this test:

TABLE 1

Compatibility Test

| Compatibility Temperature | Results |
|---|---|
| Compatibility temperature <50° C. | Completely compatible system |
| 100° C. > compatibility temperature > 50° C. | Reasonable compatible system |
| 150° C. > compatibility temperature > 100° C. | Partly compatible system |
| Compatibility temperature >150° C. | Incompatible system |

Fogging was determined by ASTM D5393-97.

Gardner Color was measured using ASTM D1544-98.

Hydroxy number was measured using ASTM D464.

Loop tack was determined according to the European Association For Self Adhesive Tape Industry (AFERA) method 4015.

Lymph Node Assay was conducted accorded to the Organisation for Economic Co-operation and Development (OECD) draft new guideline 429: Skin Sensitization Local Lymph Node Assay (LLNA) and according to the OECD Principles of Good Laboratory Practice (as revised in 1997), Paris, ENV/MC/CHEM(98)17.

Three deviations were made in the LLNA. First, the mice were marked for identification differently. Secondly, the protocol calls for $CO_2/NO_2$ anesthesia at autopsy, however, due to practical reasons, the mice were sacrificed by using euthasate. Thirdly, instead of analysis of (co)variance followed by Dunnett's multiple comparison tests, statistical analyses were performed by means of the Welch-ANOVA (for $^3$H-thymidine incorporation in the auricular lymph nodes (ARN)) because Levene's test for variances showed that variances occurred between the different groups.

Mettler prop Softening Point (MDSP) was determined by a modified ASTM D6090-99 method. The method was modified in that the measurement was performed without a ball and using a cup with a 4.5 mm hole.

MMAP Cloud Point (methylcyclohexane and aniline) was determined by ASTM D-611.

Molecular weight distribution parameters, Mn, Mw, Mz and Mp (weight at the top of the peak) were determined by Gel Permeation Chromatography (GPC) on a Waters GPC 2690 system equipped with Waters Styragel HR2 (7.8×300 mm) columns and a Waters 410 RI detector. Polystyrene standards were used for calibration.

Moisture Vapor Transport Rate (MVTR) was measured by ASTM 3-96.

Peel was determined by AFERA 4001. The following definitions are utilized to interpret the data from this test. Cohesive failure and slip-stick are defined in the Handbook of Pressure Sensitive Adhesive Technology, 2nd Edition, edited by Don Satas and Van Nostrand Reinhold. Cohesive failure is a failure mode leaving adhesive residue on the test panel. Slip-stick is a failure mode in which the peel force is not smooth but starts to fluctuate periodically from low to high force.

Residual monomer levels were determined by a gas chromatograph (GC) for the styrene, 2-ethylhexyl acrylate and xylene and with a high performance liquid chromatograph (HPLC) for acrylic acid.

The procedure followed when using the gas chromatograph is described below. About 5 grams of the sample and 50 mg anisole were placed in a flask, and 10 ml of acetonitrile were added. Then, the sample was dissolved in an ultrasound bath. A Trace 2000 GC Thermo Quest was utilized having a CP-WAX 57 CB (Chrompack) column having a length of 25 meters, an inner diameter of 0.25 mm, and a film thickness of 0.2 um. The temperature was 50° C. for 20 minutes with a change of temperature of 4° C. per minute, and a maximum of 200° C. was achieved for 5 minutes. The detector was a FID at 230° C. A split injector was utilized, and the carrier was hydrogen. The internal standard utilized was 250 mg anisole, and 50 mg of the substance to be analyzed (e.g. xylene, acrylate) were dissolved in 10 ml of acetonitrite.

The procedure followed when using HPLC is described below. This method was used for the analysis of styrene-acrylate tackifier resins to determine the residual acrylic acid content. The samples were dissolved in tetrahydrofuran or carbon disulfide and then filtered prior to analysis by reverse phase HPLC. An external standard of acrylic acid was used for calibration. The acrylic acid standard and the styrene-acrylate tackifier resin samples were analyzed on a Zorbax® RX-C18 column (5 µm), using a two-part gradient. This two-part gradient consisted of part (1) 2% methanol in 0.05 M phosphoric acid for the elution of the acrylic acid and part (2) 100% tetrahydrofuran for purging the column during the actual sample analysis. The purge helped to minimize chromatographic problems for repetitive analysis. Peak detection was accomplished by monitoring the eluent with a UV detector. The primary UV wavelength monitored was 200 nm. The average response factor for acrylic acid was determined by several injections. The calibration curve of the acrylic acid standard was linear over the range of 0-1000 ppm with a lower limit of detection of about 5 ppm.

The following is a summary of the apparatus and chromatographic conditions utilized for the HPLC.

Apparatus:

(1) Liquid chromatograph, Hewlett-Packard Model 1090, or equivalent.

(2) Ultraviolet (UV) detector, Hewlett-Packard Model 1100, or equivalent.

(3) Data system or integrator capable of measuring peak area.

(4) Column, Zorbax® RX-C18 (5 µm), 150 mm×4.6 mm—available from Agilent located in Palo Alto, Calif.

(5) Guard column cartridge, Zorbax® RX-C18 (5 µm), 12.5 mm×4.6 mm—available from Agilent, or equivalent.

(6) Sample loop injection valve, 5 µL, Rheodyne Model 7125—available from Supelco located in Bellefonte, Pa.

(7) Vortex mixer—available from VWR Scientific located in West Chester, Pa.

Chromatographic Conditions
  Flow rate: 1.0 ml/min
  Injection volume: 5 μL
  Column oven temperature: 40° C.
  Detector: UV
  Wavelengths: 200 nm, 210 nm
  Mobile Phase: A=Methanol/5 mmol $H_3PO_4$ in water (2/98)
    B=Tetrahydrofuran (100)
  Gradient: Part 1) 0-10.10 min 100% A
    Part 2) 10.10-25.0 min 100% B (column purge)

Ring and Ball Softening Point was determined by ASTM E-28 with Walter Herzog MC-753 equipment.

Shear Adhesion Failure Test (SAFT) was determined when tape was placed on a metal plate weighing 1 kg. The tape on this plate was heated from 30° C. with the heat increasing by 0.37° C./minute until the tape released from the plate.

Shear was determined by AFERA 4012.

UV absorbance was measured spectrophotometrically using a DR/4000 U Spectrophotometer supplied by Lange Group in Tiel, The Netherlands.

UV-C is the effective wavelength for curing a UV-curable adhesive composition. UV-C was measured with a calibrated UVICURE PLUS 8788, a self-contained electro-optic radiometer obtained from Electronic Instrumentation and Technology, Inc, Sterling, Va.

In some experiments, the total UV dose was measured. In others, the UV-C dose was measured. A relation between total UV dose and UV-C dose was determined for the equipment utilized in these examples. Testing was conducted by varying the UV dose for some UV-curable adhesive compositions. The results are given in FIG. 1 and Table 2

TABLE 2

Relation Between Total UV Dose and
UV-C Dose for the Equipment Used

| UV total | UV-C |
|---|---|
| 139 | 18 |
| 195 | 26 |
| 311 | 42 |
| 470 | 64 |

Table 2 and FIG. 1 can be used to compare the results when measuring total UV rather than UV-C.

Inventive Example 1

Synthesis of the Inventive Styrene-Acrylate Tackifier Resins

Styrene-acrylate tackifier resins were produced in a high-pressure reactor using a fed batch method. Xylene was used as a solvent and was pumped into the reactor and heated with stirring under nitrogen atmosphere to 150° C. The monomers (styrene, acrylic acid, and 2-ethyl hexyl acrylate) and 2% by weight initiator based on the weight of the monomers were mixed to produce a monomer-initiator feed stream. The monomer-initiator feed stream was added gradually to the hot solvent over two hours to produce a reaction mixture. During the addition of the monomer-initiator feed, the reaction temperature was maintained at 150° C.

After the monomer-initiator feed stream addition was completed, the reaction mixture was stirred for another 30 minutes at this temperature and at a pressure of about 3 bar. Subsequently, a small amount of initiator was post-added, and the process was maintained for another 30 minutes at 150° C. to produce a tackifier resin product stream. The styrene-acrylate tackifier resin was isolated from the tackifier resin product stream by distilling off the solvent. The temperature was slowly increased to 170° C., and vacuum was applied up to 25 mbar. After about 30 minutes, 90% of the solvent was evaporated. After 2.5 hours, the temperature reached 170° C. and vacuum reached 25 mbar, and about 99% of the solvent was removed. At this point, steam from the bottom of the reactor was injected resulting in about 0.5 liter of condensate per minute. Vacuum was slightly increased to 40 mbars as a result of the steam stripping. Steam stripping of the styrene-acrylic tackifier resin occurred for about 9 hours for Formulation I and 7 hours for Formulation II. The properties of the styrene-acrylate tackifier resin produced in this process are given in Table 3.

TABLE 3

Tackifier Resin Formulations and Properties

| | Styrene-Acrylic Tackifier Formulation I | Data before steaming | Styrene-Acrylic Tackifier Formulation II | Data before steaming |
|---|---|---|---|---|
| Styrene (wt %) | 61.2 | | 24.9 | |
| 2-Ethylhexyl acrylate (wt %) | 30.7 | | 44.2 | |
| Acrylic acid (wt %) | 8.0 | | 13.7 | |
| DTBP[1] (wt % based on total monomer weight) | 1.7 | | 1.5 | |
| Temperature (° C.) | 153 | | 150 | |
| R&B Softening Point (° C.) | 99.7 | 98.3 | 82.1 | |
| Color, Gardner | 0.1 | 0.1 | 0.5 | |
| Acid Number, mg KOH/g | 60.1 | 59.1 | 112 | |
| Mz, Daltons | 15060 | | 13400 | |
| Residuals: | | | | |
| Styrene, ppm | 29 | 34 | <10 | 20 |
| 2-ethylhexyl acrylate, ppm | 12 | 476 | 40 | 990 |
| Acrylic Acid, ppm | 110 | 218 | 134 | |
| Solvent, ppm | 24 | 1092 | <10 | 640 |

[1]DTBP—di-tert butyl peroxide

Residual styrene levels were less than 29 ppm, and residual 2-ethylhexyl acrylate levels were less than 40 ppm. Residual acrylic acid was less than 134 ppm, and residual solvent was less than 24 ppm. These levels were significantly less than the residual monomer and solvent levels of the styrene-acrylate tackifier resins prior to steaming and to other commercial tackifiers as shown in Comparative Example 2. It should also be noted that the other properties of the styrene-acrylate tackifier resins were hardly effected by removing a substantial portion of the residual monomers. Low levels of residual monomers are extremely important for the end application, since the residual monomers can cause skin sensitivity. Low residual monomer and solvent levels in the tackifier resins can also positively influence the fogging behavior of an UV-curable adhesive composition.

Comparative Example 2

Residual Monomer Levels in Other Tackifiers

Tackifier resins were obtained from SC Johnson and evaluated to determine the amount of residual monomers. The data are shown in Table 4.

TABLE 4

Residual Monomer Levels in Comparative Tackifiers

| Product Name | Joncryl 586 | Joncryl 678 | Joncryl SX815 |
|---|---|---|---|
| R&B (° C.) | 121.8 | 165 | 115.3 |
| Acid Number (mg KOH/g) | 104 | 216 | 394 |
| Gardner Color | 0 | 0 | 0 |
| MMAP (° C.) | 35 | 57 | 42 |
| Mp (Daltons) | 4161 | 8064 | 10285 |
| Mn (Daltons) | 2692 | 4621 | 5455 |
| Mw (Daltons) | 4921 | 9663 | 11275 |
| Mz (Daltons) | 8432 | 17755 | 19550 |
| Residual Monomer | | | |
| Acrylic Acid (ppm) | 585 | 2200 | 580 |
| Styrene (ppm) | 1200 | 200 | 60 |
| Alpha-methyl styrene (ppm) | 1000 | 800-900 | 600 |

As can be observed from the data in Table 4, the residual monomer concentration for the tackifier resins from SC Johnson are significantly above the inventive tackifier resins.

Example 3

Variation of Monomer Repeating Unit Amounts in Styrene-Acrylate Tackifier Resins—Effect on Properties The amount of the monomer repeating units in the styrene-acrylate tackifier resins were varied using the same process as described in Example 1, and the resulting properties of the styrene-acrylate tackifier resins were monitored. The results of these experiments are given in Table 5.

TABLE 5

Variation of Monomer Amounts in Styrene-Acrylate Tackifier Resins - Effect on Properties

| Exp. No | styrene wt % | acrylic acid wt % | 2-ethyl hexyl acrylate wt % | MDSP ° C. | Colour Gardner | Acid number mg KOH/g | MMAP ° C. | Mp Dalton | Mn Dalton | Mw Dalton | Mz Dalton |
|---|---|---|---|---|---|---|---|---|---|---|---|
| 3.1 | 25 | 5 | 70 | 44.9 | 0.1 | 39 | 6 | 7123 | 3519 | 8358 | 15921 |
| 3.2 | 25 | 15 | 60 | 84.4 | 0.4 | 112 | 7 | 8462 | 3729 | 10139 | 21198 |
| 3.3 | 25 | 25 | 50 | 114.9 | 0.6 | 187 | 15 | 7725 | 3390 | 9382 | 18976 |
| 3.4 | 38.3 | 11.7 | 50 | 95.9 | 0.2 | 88 | 4 | 10100 | 4099 | 11752 | 23766 |
| 3.5 | 38.3 | 18.3 | 43.3 | 112.9 | 0.3 | 130 | 16 | 10916 | 3859 | 12729 | 27459 |
| 3.6 | 45 | 5 | 50 | 76.2 | 0.3 | 35 | −2 | 11030 | 4434 | 12299 | 23896 |
| 3.7 | 45 | 25 | 30 | 141.2 | 0.7 | 172 | 32 | 12128 | 4087 | 18170 | 52090 |
| 3.8 | 51.7 | 11.7 | 36.7 | 116.4 | 0.2 | 87 | 15 | 12560 | 4712 | 14004 | 27649 |
| 3.9 | 55 | 20 | 25 | 142.7 | 0.5 | 141 | 31 | 12418 | 3953 | 14815 | 32181 |
| 3.10 | 65 | 5 | 30 | 108.5 | 0.2 | 37 | 11 | 12712 | 5138 | 13953 | 25842 |
| 3.11 | 65 | 15 | 20 | 141.4 | 0.2 | 110 | 27 | 12997 | 4405 | 14603 | 28915 |
| 3.12 | 65 | 25 | 10 | 171.2 | 1.5 | 149 | 44 | 13415 | 3831 | 20018 | 51019 |

When the amount of monomer was varied, styrene-acrylate tackifier resins were obtained with a MDSP from about 44.9° C. to about 171.2° C., with acid numbers from 35 mg KOH/g to 187 mg KOH/g, a MMAP from 4° C. to 32° C., and a Mz from 15921 to 51019 Dalton. More styrene instead of acrylic acid or 2-ethylhexylacrylate made the styrene-acrylate tackifier resin more aromatic resulting in a higher MDSP and a higher Mz. More acrylic acid increased the acid number and the functionality. It also increased the softening point and the MDSP.

Example 4

Skin Sensitivity of the Tackifier Resin

A local lymph node assay test (LLNA) in mice was performed to determine if the styrene-acrylate tackifier of Formulation II in Example 1 has skin sensitivity properties. Under the experimental conditions, there were no indications that the styrene-acrylate tackifier resin of Formulation II (see Example 1) had sensitizing properties.

The basic principle underlying the LLNA is that sensitizers induce a primary proliferation of lymphocytes in the lymph node draining the site of chemical application. This proliferation only occurs with allergens and is proportional to the dose applied. Therefore, the LLNA provides a simple means of obtaining an objective, quantitative measurement of sensitization.

Hexyl cinnamic aldehyde was used as a positive control. The hexyl cinnamic aldehyde was mixed in acetone/olive oil to a concentration of 25% by volume. A mixture of acetone and olive oil in a 4:1 ratio was used as a negative control. The tackifier resin was diluted in acetone/olive oil (4:1 v/v) to the desired concentration.

Twenty mice were divided into 5 groups of 4 animals each. Three groups of 4 mice each were treated with different doses of the tackifier resin (Group B: 10%; Group C: 25%; and Group D: 50%). Group E was treated with the positive control substance, and Group A was treated with the negative control. On day 0, 1, and 2, the test substance was administered with 25 μl on each ear of the mouse.

The data collected showed that there were no indications that the tackifier resin had skin sensitizing properties.

Example 5

Thermal Stability of Styrene-Acrylate Tackifier Resins

The thermal stability of the styrene-acrylate tackifier resins produced in Example 1 has been studied. The results are given in Table 6. The styrene-acrylate tackifier resins were heated as specified in Table 6.

TABLE 6

Thermal Stability of Styrene-Acrylate Tackifier Resins Produced In Example 1

|  |  | Styrene-Acrylic - Formula I | Styrene Acrylic - Formula II |
|---|---|---|---|
| R&B softening point (° C.) | Initial | 96.3 | 75.7 |
|  | 3 hours at 160° C. | 99.1 | 82.9 |
|  | 10 hours at 140° C. | 99.2 | 83.2 |

TABLE 6-continued

Thermal Stability of Styrene-Acrylate Tackifier Resins Produced In Example 1

|  |  | Styrene-Acrylic - Formula I | Styrene Acrylic - Formula II |
|---|---|---|---|
| Acid number (mg KOH/g) | Initial | 59 | 117 |
|  | 3 hours at 160° C. | 59 | 119 |
|  | 10 hours at 140° C. | 59 | 118 |
| Gardner color | Initial | 0.2 | 0.5 |
|  | 3 hours at 160° C. | 0.2 | 0.7 |
|  | 10 hours at 140° C. | 0.3 | 0.8 |
| Molecular weight (Dalton) | initial Mn | 3804 | 2970 |
|  | Mw | 9320 | 7187 |
|  | Mz | 17833 | 14688 |
|  | 3 hours at 160° C. Mn | 3671 | 2928 |
|  | Mw | 9300 | 7299 |
|  | Mz | 17904 | 15348 |
|  | 10 hours at 140° C. Mn | 3718 | 2979 |
|  | Mw | 9300 | 7329 |
|  | Mz | 17833 | 15321 |

The R&B softening point of the styrene-acrylate tackifier resin increased slightly upon heating. All other tackifier resin properties were not influenced by heating under the given circumstances. Therefore, it can be concluded that the styrene-acrylate tackifier resins do not only have good gelling stability but also a good heat stability, despite the fact that no antioxidants were used. The Reactol® AC 11 and AC 18 tackifier resins were also aged upon heating, and both products showed an unstable performance. Initially, Reactol® AC11 and AC18 tackifier resins were liquid, after 24 hours at 175° C., the products were gels. This can be due to transesterification reactions. However, at temperatures below about 175° C., Reactor® AC11 and AC 18 tackifier resins function well in UV-curable adhesive compositions and do not gel.

Example 6

Moisture Vapor Transfer Rate and Fogging Tests

Two other advantages of the use of styrene-acrylate tackifier resins compared to conventional tackifiers, such as, Foral® 85-E rosin esters and Kristalex® F100 aromatic resin are that styrene-acrylate tackifiers can give better results in fogging tests and does not significantly reduce the MVTR of the adhesive composition. Films prepared with an 18:85 ratio of tackifier resin to UV-curable acrylic composition were evaluated. In case of MVTR, the films were transferred to a highly breathable kimwipe structure, and the values was corrected by assuming that the resistances (1/MVTR) were additive. Results are given in Table 7.

TABLE 7

MVTR Results and Fogging Results of Various Tackifier Resins in acResin ® 258 Acrylic Copolymer (15:85) at a Coating Weight of 30 g/m$^2$ and a UV-C Dose of 25 mJ/cm$^2$

|  | MVTR | Fogging |
|---|---|---|
| Curing dose | 25 | 25 |
| No resin | 971 | 96.5 |
| Foral 85-E | 696 | 81 |

TABLE 7-continued

MVTR Results and Fogging Results of Various Tackifier Resins in acResin ® 258 Acrylic Copolymer (15:85) at a Coating Weight of 30 g/m² and a UV-C Dose of 25 mJ/cm²

|  | MVTR | Fogging |
|---|---|---|
| Kristalex F100 | 769 | 83 |
| Styrene-acrylate Tackifier (Formulation I) | 790 | 95.4 |
| Styrene-acrylate Tackifier (Formulation II) | 843 | 96.5 |
| Reactol AC 11 | 1035 | 78.3 |
| Reactol AC 18 | 698 | 88.5 |
| Reactol OS 65 | 2478 | 90.7 |

Only insignificant decreases in the MVTR was observed for the styrene-acrylate tackifier resins compared to the acResin® acrylic copolymer alone. In case of Reactol® AC 11 acrylic resin and Reactol® OS 65 acrylic resin, even an increase was observed. In case of Reactol® OS 65 acrylic resin, the MVTR was even twice as high as for the other films so this indicates that the styrene-acrylate chemistry can be modified to effect MVTR in a controlled way.

The fogging data at 25 mL/cm² clearly showed that the results for styrene-acrylate tackifiers of Formulation I and II were much better than for conventional tackifiers such as Foral® 85-E rosin esters and Kristalex® aromatic resin. Foral® 85-E rosin esters and Kristalex® aromatic resins increased fogging while the use of the inventive styrene-acrylate tackifier resins produced in Example 1 hardly showed any differences in fogging compared to the acResin® 258 acrylic copolymer alone. The Reactol® tackifier resins also tended to increase fogging, which again showed the effect of the residual monomer removal. In case of the styrene-acrylate tackifier resin of Formulation I, almost no increase was observed.

Example 7

Solvent-Based Adhesive Compositions

Styrene acrylate tackifiers can be used to tackify solvent-based acrylic polymers. These styrene-acrylic tackifier can be used in radiation-curable, heat curable, and non-cured adhesive compositions. In this example, two styrene-acrylate tackifier resins, Formulation I and II from Example 1, were compared with two conventional tackifiers in two solvent-based acrylic polymers, Solucryl 300 and Solucryl 303, produced by UCB in Brussels, Belgium. The tackifier resins were mixed in a 5:85 ratio with the solvent-based acrylic polymer and coated at a coating weight of 30 g/m². The coatings were dried and cross linked for 10 minutes at 110° C.

The results were also compared with hot-melt adhesives produced from the styrene-acrylate tackifier resins of Formulation I and II and acResin® acrylic copolymer produced by BASF. The following procedure was used in the hotmelt coating method. The acResin® acrylic copolymer and tackifier resin were mixed together in an aluminium tray on a hot-plate at 150° C. to produce a UV-curable acrylic adhesive composition. After the mixing, the UV-curable acrylic adhesive composition was poured in a LC 200 pilot-plant-scale Lab-coater and coated onto 200 mm wide bi-axially oriented polypropylene (BOPP) film at about an average 7 m/minute coating speed at 140° C. The coating speed depended on the viscosity of the UV-curable adhesive composition, therefore, 7 m/minute was the average.

TABLE 8

Application Results of Various Tackifier Resins with acResin ® 258 Acrylic Copolymer (15:85) at a Coating Weight of 30 g/m² and a UV-C Dose of 50 mJ/cm² Compared with Application Results of Several Tackifier Resins with Solvent-Based Acrylic Polymers in a Ratio 15:85 at a Coating Weight of 30 g/m²

|  | Peel Adhesion to Steel 1 min (N/25 mm) Hotmelt, UV | Peel Adhesion to PE 10 min (N/25 mm) Hotmelt, UV | Loop tack to steel (N/25 mm) Hotmelt, UV | SAFT, 1 kg 0.5° C./min (° C.) Hotmelt, UV |
|---|---|---|---|---|
| acResin ® 258, no resin | 6.94 | 1.01 | 12.91 | 141 |
| Styrene-acrylic resin (Formulation I) + acResin ® 258 | 9.09 | 2.20 | 16.54 | 100 |
| Styrene-acrylic resin (Formulation II) + acResin ® 258 | 11.75 | 2.59 | 16.38 | 78 |
| Solucryl 300, no resin | 6.79 | 1.37 | 10.12 | 155 |
| Styrene-acrylic resin (Formulation I) + Solucryl 300 | 8.55 | 1.82 | 11.28 | 114 |
| Styrene-acrylic resin (Formulation II) + Solucryl 300 | 8.73 | 1.57 | 13.22 | 104 |
| Reactol AC 11 + Solucryl 300 | 6.88 | 1.25 | 11.31 | 151 |
| Reactol AC 18 + Solucryl 300 | 7.83 | 1.32 | 12.78 | 150 |
| Foral 85-E + Solucryl 300 | 8.07 | 3.05 | 10.81 | 144 |
| Kristalex F100 * + Solucryl 300 | 6.27 | 1.55 | 6.42 | 155 |
| Solucryl 303, no resin | 6.61 | 2.04 | 9.02 | 149 |
| Styrene-acrylic resin (Formulation I) + Solucryl 303 | 9.22 | 1.95 | 15.15 | 148 |

TABLE 8-continued

Application Results of Various Tackifier Resins with acResin ® 258
Acrylic Copolymer (15:85) at a Coating Weight of 30 g/m$^2$
and a UV-C Dose of 50 mJ/cm$^2$ Compared with Application
Results of Several Tackifier Resins with Solvent-Based Acrylic
Polymers in a Ratio 15:85 at a Coating Weight of 30 g/m$^2$

|  | Peel Adhesion to Steel 1 min (N/25 mm) Hotmelt, UV | Peel Adhesion to PE 10 min (N/25 mm) Hotmelt, UV | Loop tack to steel (N/25 mm) Hotmelt, UV | SAFT, 1 kg 0.5° C./min (° C.) Hotmelt, UV |
|---|---|---|---|---|
| Styrene-acrylic resin (Formulation II) + Solucryl 303 | 8.00 | 1.39 | 8.62 | 79 |
| Reactol AC 11 + Solucryl 303 | 7.02 | 1.46 | 8.21 | 148 |
| Reactol AC 18 + Solucryl 303 | 8.14 | 1.99 | 14.94 | 147 |
| Foral 85-E + Solucryl 303 | 8.46 | 3.29 | 8.93 | 139 |
| Kristalex F100 * + Solucryl 303 | 6.13 | 1.71 | 5.46 | 148 |

* Kristalex F100 was incompatible in the Solucryl polymers

The results showed that Foral®85-E rosin ester was a very good tackifier for the Solucryl 300 type. Good peel to PE values were found for Foral® 85-E rosin ester, while the SAFT was hardly effected (decreased from 155° C. to 144° C.). The use of the styrene-acrylate tackifier resin also improved peel to steel, to PE and especially loop tack was improved, more than with Foral® 85-E rosin ester.

Styrene-acrylate tackifier (Formulation I) was found to be a very good tackifier for the Solucryl 303® acrylic polymer. Peel to steel and loop tack both increased while SAFT was hardly effected. Foral 85-E® rosin ester also showed an increase in peel to steel and PE, but the loop tack decreased, and there was a larger increase in SAFT.

Generally, it can be concluded that depending on the solvent-based acrylate polymer and the desired properties of the adhesive, styrene-acrylate tackifier resins, such as those of Formulation I and II in Example 1, can be used as a tackifier resin for solvent-based acrylic polymers.

When comparing the hotmelt UV-curable adhesive composition to the solvent-based adhesive compositions, it can be concluded that the use of the tackifier resin in hot-melt UV-curable adhesive compositions generally results in lower SAFT values, while SAFT values for the solvent-based adhesive compositions are higher when using tackifier resins.

Example 8

Water-Based Adhesive Compositions

Styrene-acrylate tackifiers also can be used in water-based acrylic polymer systems. The tackifier resins were dispersed in water to a 50% dispersion, using a surfactant for stabilization. The final dispersion was mixed in a 1:3 ratio with Acronal® V215, a water based acrylic polymer from BASF. The adhesives were coated and dried to 21 gsm.

TABLE 9

Application Results of Various Tackifier Resins in a Water-Based Adhesive Compositions Containing Acronal ® V215 as an Adhesive Component

|  | Peel Adhesion to cardboard at 23° C. 5 min (N/25 mm) | Peel Adhesion to PE at 23° C. 5 min (N/25 mm) | Loop tack to PE at 23° C. 5 min (N/25 mm) | Shear adhesion on steel at 23° C. (minutes) |
|---|---|---|---|---|
| Acronal + no resin | 7 | 7 | 8 | 8000 |
| Styrene-Acrylic Tackifier (Formulation I) + Acronal | 4 | 15 | 6 | 2310 |
| Styrene-Acrylic Tackifier (Formulation II) + Acronal | 4 | 14 | 5 | 990 |
| Reactol AC 11 + Acronal | 10 | 18 | 8 | 195 |
| Tacolyn[1] 3179H + Acronal | 16 | 25 | 12 | 150 |

[1]Tacolyn ® 3179H is a rosin ester dispersion produced by Eastman Chemical company.

The results in the Table 9 showed that the styrene-acrylate tackifiers can be used in water-based adhesive compositions and show clearly the effect of the various tackifier resins. The effects appear to be softening point related. With Reactol AC 11 having the lowest softening point, shear was decreased the most, but peel adhesion clearly increased compared to the Acronal® V 215 polymer alone. Using the two other tackifiers, Reactol® AC11 and Tacolyn® 3179H, the shear adhesion was clearly decreased, and especially peel adhesion to PE was improved. No large differences were found for the adhesion properties between styrene-acrylate tackifier resins of Formulation I and II of Example 1. Only the shear for the styrene-acrylate tackifier resin of Formulation I was higher, which was most likely due to the higher softening point. The properties of the Reactol® AC 11 acrylic resin came close to the conventional tackifier dispersion (Tacolyn® 3179H), normally used for these water-based polymers. Adhesion was slightly decreased, but cohesion (shear) was increased.

We claim:

1. A process to produce a tackifier resin, said process comprising contacting a tackifier resin product stream with at least one carrier at a temperature sufficient to remove a portion of at least one residual monomer from said tackifier resin product stream to produce said tackifier resin; wherein said carrier is selected from the group consisting of steam, nitrogen, and ethane.

2. A process according to claim 1 wherein said contacting occurs at a temperature in a range of about 150° C. to about 250° C.

3. A process according to claim 1 wherein said contacting occurs at a pressure in a range of about 10 mbar to about 1000 mbar.

4. A process to produce a tackifier resin, said process comprising:
   a) providing at least one aromatic monomer, at least one acrylate monomer, and optionally at least one solvent to a reactor zone to produce a reaction mixture;
   b) polymerizing said reaction mixture in the presence of at least one initiator to produce a tackifier resin product stream; and
   c) contacting said tackifier resin product stream with a carrier to remove a portion of at least one residual monomer from said tackifier resin product stream to yield said tackifier resin; wherein said carrier is selected from the group consisting of steam, nitrogen, and ethane.

5. A process to produce a tackifier resin, said process comprising:
   a) providing at least one aromatic monomer, at least one acrylate monomer, and optionally at least one solvent to a reactor zone to produce a reaction mixture;
   b) polymerizing said reaction mixture in the presence of at least one initiator to produce a tackifier resin product stream;
   c) heating said tackifier resin product stream at a temperature sufficient to remove a portion of at least one residual monomer from said tackifier resin product stream; and
   d) contacting said tackifier resin product stream with at least one carrier to further remove a portion of said residual monomer to produce said tackifier resin; wherein said carrier is selected from the group consisting of steam, nitrogen, and ethane.

6. A process to produce a tackifier resin according to claim 5 wherein said heating is conducted at a temperature ranging from about 150° C. to about 250° C.

7. A process to produce a tackifier resin according to claim 5 wherein said heating is conducted at a pressure in a range of about 10 mbar to about 1000 mbar.

8. A process to produce a tackifier resin, said process comprising:
   a) providing at least one aromatic monomer, at least one acrylate monomer, and optionally at least one solvent to a reactor zone to produce a reaction mixture;
   b) polymerizing said reaction mixture in the presence of at least one initiator to produce a tackifier resin product stream;
   c) heating said tackifier resin product stream at a temperature in a range of about 150° C. to about 250° C. to remove a portion of the residual monomers from said tackifier resin product stream; and
   d) contacting said tackifier resin product stream with a carrier to further remove a portion of said residual monomers to yield said tackifier resin having residual monomer concentrations of less than about 200 ppm of aromatic monomer and 400 ppm of acrylate monomer; wherein said carrier is selected from the group consisting of steam, nitrogen, and ethane.

9. A process to produce a tackifier resin, said process comprising:
   a) contacting at least one aromatic monomer, at least one acrylate monomer, and at least one initiator to produce a monomer-initiator stream;
   b) routing said monomer-initiator stream to a reaction zone containing solvent at a temperature in a range of about 100° C. to about 250° C.;
   c) polymerizing said monomer-initiator feed stream at polymerization conditions to produce a tackifier resin product stream;
   d) optionally, providing an additional amount of initiator to said reaction zone;
   e) heating said tackifier resin product stream at a temperature in a range of about 150° C. to about 250° C. and at a pressure of about 10 mbar to about 1000 mbar to remove a portion of said residual monomers from said tackifier resin product stream; and
   f) contacting said tackifier resin product stream with steam at a temperature of about 150° C. to about 250° C. and at a pressure of about 10 mbar to about 1000 mbar to further remove said residual monomers to yield said tackifier resin having residual monomer concentrations of less than 200 ppm by weight of aromatic monomer based on the weight of said tackifier resin and 400 ppm of acrylate monomer based on the weight of said tackifier resin; wherein said carrier is selected from the group consisting of steam, nitrogen, and ethane.

* * * * *